Dec. 8, 1970          K. G. SCOTT          3,545,927
MEASUREMENT OF CELL MEMBRANE KINETICS
Filed July 14, 1967          3 Sheets-Sheet 1
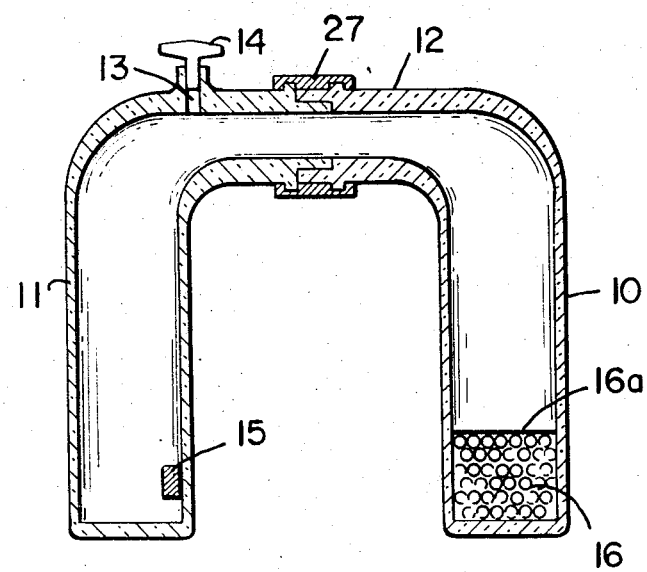
FIG_1
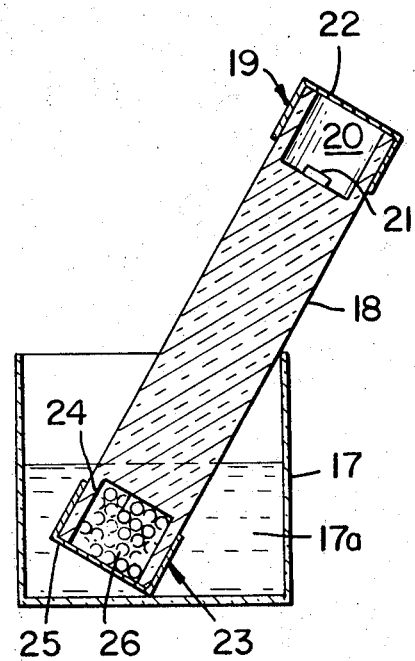
FIG_3
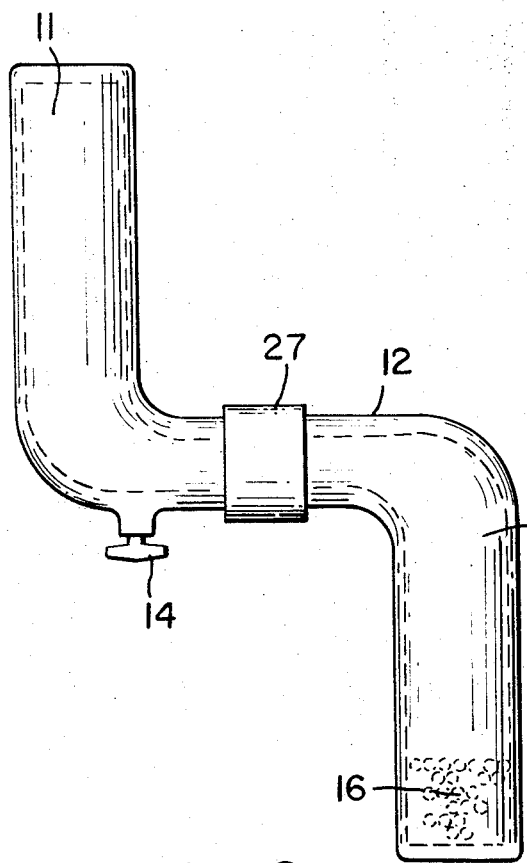
FIG_2
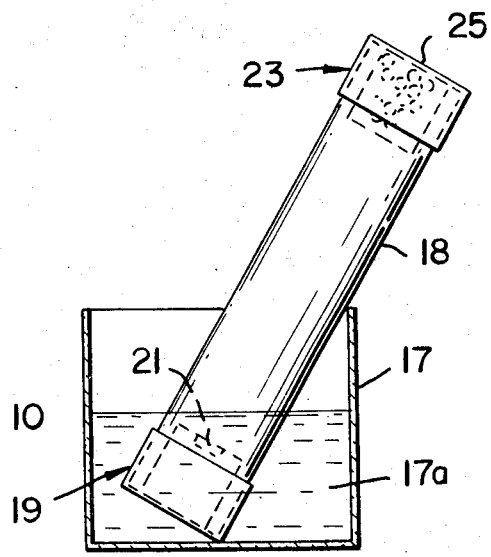
FIG_4
INVENTOR.
KENNETH G. SCOTT
BY
*Townsend and Townsend*
ATTORNEYS

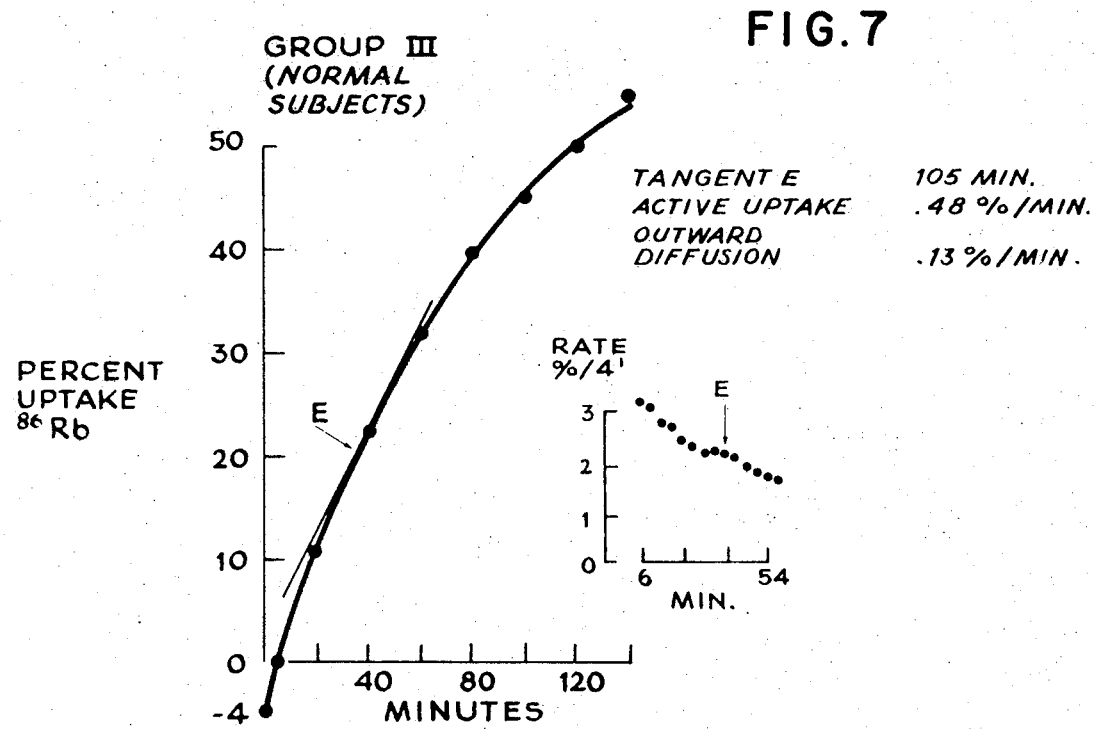

United States Patent Office 3,545,927
Patented Dec. 8, 1970

3,545,927
MEASUREMENT OF CELL MEMBRANE KINETICS
Kenneth G. Scott, 111 Wildomar,
Mill Valley, Calif. 94941
Filed July 14, 1967, Ser. No. 653,420
Int. Cl. G01n 31/00, 31/04
U.S. Cl. 23—230               8 Claims

ABSTRACT OF THE DISCLOSURE

Measurement of cell membrane kinetics and its use in cancer detection and treatment as well as evaluation of other chronic disorders such as anemia and schizophrenia through the quantitation of radioactive cation transport by cells. The method includes the establishment of the equilibrium point where passive diffusive movement of ions into and out of the cells is substantially equal, at which time the pumping or active transport rate of the cells can be determined. The passive rate in terms of outward diffusion is then determined based upon the previously determined active rate. Apparatus employing ion exchange resins for making the measurements needed for determining the active and passive rates is also provided.

---

This invention relates to the measurement of cell membrane kinetics. More particularly, the invention provides a method and apparatus for measuring both active and passive rates of cation transport by cells by monitoring the passage of radioactive cations across the cell membrane. Changes from the norm are used as an indication of the presence of cancer in the patient.

Many investigators have searched for tests that will detect an early cancer, measure the activity of a known cancer, or reflect the suppressive effect of various therapies on this activity. In this regard alterations in the permeability of red blood cells from cancer patients have been recognized. Heretofore this phenomenon has not been applied to a test which would provide data that could be generally used for the detection of cancer. The present invention is designed to accumulate data on the permeability of cells, particularly red blood cells, that is generally reproducible and interpretable in terms of identifying patients who have cancer. All prior work in this area has simply established that a decrease from normal of the net accumulation of a radioactive cation by the red blood cells of cancer patients exists. The present invention provides a method for determining both the active and passive accumulation rates by cells and relates these rates in cells from a cancer patient to a norm. It has been discovered that these two rates can both be effectively used for comparison against standards in screening for the presence of cancer and its management. Although cancer will be used to illustrate the principles involved, the methods are equally applicable to investigation of such disorders as heart disease, anemia, and schizophrenia.

In more detail, the present invention is based on the finding that cells such as red blood cells exhibit a rate of change of cation uptake which consists of two components—an early fast component and a subsequent slower one. The fast component involves both the passive diffusion of cations into the cell and the active uptake by the cell. Initially, both the active uptake and passive diffusion are working in the same direction. At a later point, these components diverge as the cation concentration in the cell exceeds that of the surrounding diluent. The point where the rate change occurs represents that point where the passive diffusion is in a state of substantial equilibrium into and out of the cell. Rate measurements made at this time represent the active transport rate or pumping rate of the cell. Location of the equilibrium point (referred to as point E herein) is crucial to the invention. Only after it is located can the passive and active transport rates be determined. Two methods for locating point E will be discussed herein.

Once the active rate for the cell has been determined, passive diffusion can be determined based upon this pumping rate. In this aspect, measurements are made at a time subsequent to the equilibrium point and the difference between the observed cation content of the cell and that which would theoretically be present based upon the pumping rate (assumed to be constant) in the absence of outward diffusion provides data indicative of the outward diffusion of the cells. Both the active uptake rates and the outward diffusion rates of cancer cells are shown in the present invention to be consistently significantly higher than those of control non-cancer patients and of normal subjects. In other investigations, the rates of patients being tested may vary from the norm in the opposite direction. For example, in studies on schizophrenics, the rates were found to be significantly lower than the norm. (See Federation Proceedings March–April 1967, vol. 26, No. 2; Abstracts, 51st Annual Meeting, Chicago, Ill., April 16–21, 1967; published by: Federation of American Societies for Experimental Biology; Psychopharmacology II, 1380.) As is recognized in the art, certain conditions such as pregnancy or schizophrenia may result in doubtful values around the point dividing positive from negative test results (see Review Gastroenterology, M. M. Black, 1950, pp. 481–487 and J.A.M.A., vol. 147, No. 1, September 1951, pp. 37–39). Accordingly, in determining the rates of suspected cancer patients, care must be exercised in likewise determining the presence of other conditions which may result in false positive or negative test results.

IN THE ACCOMPANYING DRAWINGS

FIG. 1 shows in schematic side section apparatus suitable for measuring cell kinetics in accordance with the present invention;

FIG. 2 shows in side elevation the device of FIG. 1 in a rotated position required for use;

FIG. 3 shows in side section an alternative embodiment of a device for practicing the present method;

FIG. 4 shows in side elevation the device of FIG. 3 in an inverted position as required for use;

FIGS. 5–7 are plots of data taken from measurements on red blood cells of non-cancer hospitalized patients, cancer patients, and normal subjects, respectively, in accordance with the present method and illustrating the increased active uptake and outward diffusion rates of the cancer patients as compared with the other two groups.

Figure 5:
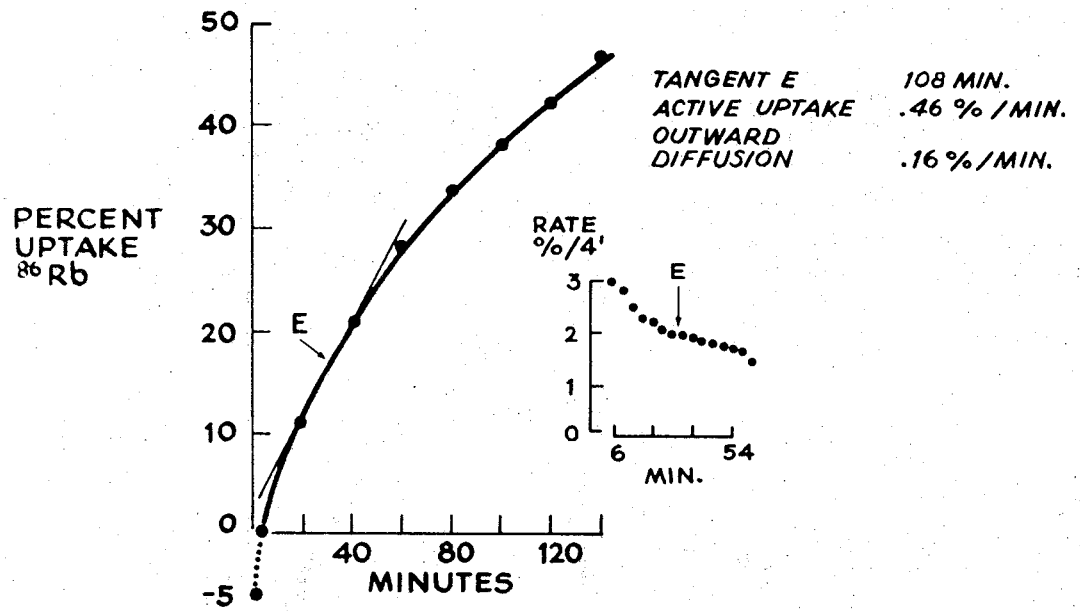

The present methods are applicable to the study of all types of cells. The ready availability of red cells and the comprehensive studies of their kinetics that have already been done make them preferably for illustrative purposes. The experimental work to be discussed has therefore been obtained on erythrocytes.

For purposes of monitoring the passage of cations, any suitable radioactive tracer element is conveniently selected. Because of its convenient decay scheme (18.6 day half-life), high specific activity (1.0 mev. gamma emission) of readily available radioactive rubidium, and the similarity between $^{86}Rb$ and potassium transport by red blood cells, $^{86}Rb$ is the preferred tracer for the study of erythrocyte kinetics. These properties permit use of the $^{86}Rb$ isotope without overloading the potassium pool of the cells which would in turn alter cation kinetics. The data shown in Table I below and plotted in the curves of FIGS. 5–7 of the accompanying drawings illustrates the type of results to be expected with the present methods and concepts. The data was obtained in the following manner:

SUBJECTS

The red blood cell $^{86}$Rb kinetics of three groups of adult human males were studied. The groups consisted of (1) patients with cancer, (2) controls, hospitalized for conditions other than cancer, and (3) normal subjects who were members of the academic staff of the University of California Medical Center at San Francisco, Calif., and in good health.

Diagnosis of the cancer patients were based upon histological examination of the suspect tissue.

The controls used for statistical comparison were patients hospitalized for the following disorders: cardiovascular 10, gastrointestinal 6, endocrine 3, trauma 5, neuroskeletal 5, arthritis 7, infection 4.

The age of the cancer subjects averaged 59.2±.8 years with a range of 23–90 years. Those used as hospital controls had an average age of 49.4±3 years with a range of 25–75 years. The average age of the normals was 45.1±2 years and ranged from 30 to 60 years.

All data are expressed as mean ± standard error=

$$\sqrt{\frac{\Sigma dev^2}{n \times (n-1)}}$$

BLOOD INCUBATION PROCEDURE

Ten ml. of heparinized venous blood obtained from the groups described above was placed in a 100 ml. stoppered flask and placed in a shaker water bath at 37° C. under air. After 30 minutes of equilibration 5μc. of $^{86}$Rb made up in .5 ml. of isotonic glucose were added. The specific activity of the rubidium chloride added ranged from 180 to 5760 mc. per gram of Rb. Less than 25 micrograms of inert rubidium were used in each test. One ml. samples of blood were withdrawn at 4 minutes and then every 20 minutes after Rb addition, up to 140 minutes. Plasma was separated from the cells by centrifugation, the packed cell volume noted, and 0.2 ml. aliquots of plasma were placed in tubes for counting the $^{86}$Rb in an automatic scintillation spectrometer peaked to detect the 1.078 mev. gamma ray which is associated with 8.8% of the Rb decay to stable 89 Sr.

RESULTS

Curves of the $^{86}$Rb red blood cell uptake were plotted vs. time (FIGS. 5–7) and the rate of uptake (Tan E), active uptake in percent per minute (AU), and outward diffusion (OD) were determined as follows:

In the preferred embodiment, the counting rate of the plasma at the 4 minute point is taken as 100 percent. This is done for several reasons. Data obtained from whole blood or extrapolation of the red blood cell uptake curve shows that on an average about 5% of the Rb is incorporated in the cells in the first four minutes. A rapid uptake component described by Kahn[1] is also present in the first four minute uptake. This uptake is usually less than 5% and may be demonstrated by treating the incubated cells with 20 volumes of isotonic rubidium chloride and comparing this release with cells from the same sample treated with isotonic saline. This release occurs but once following treatment with rubidium and this rapidly exchangeable component is not considered as part of the Rb involved in cell transport.

Figure 6:
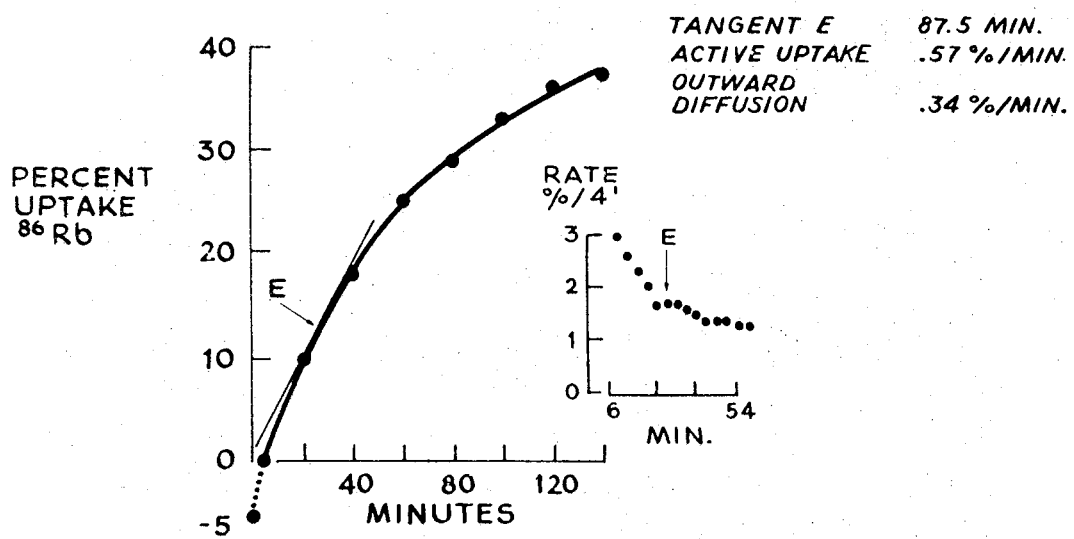

The red blood cell cation uptake following the first 4 minutes is conveniently determined from the reciprocal loss of radioactive cations from the plasma. The uptake of the red blood cells of each patient was plotted on linear paper. The individual uptakes for each point are combined to provide data for curves of the several groups as shown in FIGS. 5, 6, and 7. At passive diffusion equilibrium point E only active uptake is considered to be a significant factor in the accumulation of Rb by the cells.

This is based on the fact that the spatial distribution of rubidium ion between the cell and plasma is equal at that point; passive movement in and out are therefore equal and do not contribute to transport in either direction. As a result, the pumping rate (AU) of the cells for Rb can be established from a tangent to the uptake curve at point E. If glucose is added to maintain cell metabolism, this rate can be taken as constant during the selected time of cell incubation (140 minutes in this example).

In the preferred embodiment, the location of point E on a cation uptake curve is obtained by either of two methods. These are: (1) measuring distribution of $^{86}$Rb between cells and plasma in blood stored at 0.2 to 0.8° to obtain the cation space of the cell with respect to the plasma, and (2) determination of the point on the uptake curve where the change in rate is minimal.

Method 1 (Ion space method)

Active pumping by Rb has been shown to be inhibited at temperatures below 4° C.[2]. Twelve specimens were taken from cold stored blood at 24, 48, and 72 hours and similar results were obtained. Rb space of red blood cells was found to average .402±.03 of that of plasma. For the preferred trace, point E is accordingly determined from cation space as follows:

$$E \text{ in percent} = \frac{S}{P+S} - e$$

S=Packed cell volume × .402 (the relative Rb space in red cells)
P=1-packed cell volume relative Rb space in plasma
e=Uptake in first 4 minutes (by direct measurement or extrapolation)

Thus E was shown to occur at 17.5, 12.6, and 20 percent on the cell uptake curve for subject Groups I, II, and III, respectively, using the 4 minute point as zero. See Table I.

Method 2

When the relative change of rate-method was used for locating point E (FIGS. 5, 6 and 7) the initial rate approximated 3% for each 4 minutes period. It then decreased to where little or no change of rate was observed, as shown in the inset of FIGS. 5–7. In Group I this decrease occurred at approximately 32 minutes. In the cancer Group II, the least relative change of rate was observed to be at approximately 26 minutes while the least relative rate of change for Group III was at about 35 minutes. It will be seen that the location of Point E on the curve by this method agrees essentially with that caculated by the cation space method.

Tan $T_u$[3] was obtained from the Rb uptake curve of each subject plotted on linear paper using the straight line method or by determining Point E using the ion space method as described. Tan $T_u$ is expressed as the time in minutes that 50% of the initial plasma Rb would be actively transported by the cells. The time for Tan E so obtained was corrected for any difference in packed cell volume using the control of 42.

Thus $$\text{Tan } E_u \times \frac{S}{42} = \text{Tan } E \text{ (in minutes)}$$

S=Packed cell volume of subject. Active uptake (AU) is expressed as percent per minute being transported into the cells and was considered to operate at a constant rate

---

[1] Kahn, J. B. The Entry of Rubidium into Human Erythrocytes. J. Pharmacol. Exp. Therak. 136: 197–204, 962.

[2] Harris, E. J., Transport and Accumulation in Biological Systems, Butterworth Scientific Publications, London, 1960, 2nd ed., pp. 90–91, Academic Press, New York, N.Y.

[3] Uncorrected for differences in hematocrit of the subjects.

for the duration of the incubation and was determined in accordance with the formula:

$$AU = \frac{50\%}{\tan E}$$

The average outward diffusion (OD) could then be determined by subtracting the amount actually present in the cells (OBS.) from the amount which would have entered by active pumping in a given interval (AU×time in minutes) corrected for any difference in packed cell volume. In this case a four minute interval was elected. Thus $$OD \text{ percent min.} = \frac{AU \times 136 - OBS.}{140 - \text{Point } E \text{ min.}}$$

The pertinent data required to construct the curves shown in FIGS. 5, 6, and 7 are summarized below in Table I.

period to use for the second point. With this information, the active uptake rate can be determined in accordance with the following formula:

$$AU = \frac{\text{Uptake at 40 min. (in percent)} \times (3.5)}{\text{Uptake at 140 min. (in percent)}}$$

Similarly, outward diffusion can be approximated from the information obtained at the 40 minut and 140 minute times (or other times within the preferred ranges noted). Thus, outward diffusion in percent can be determined in accordance with the following formula selecting the 40 minute and 140 minute times as illustratives:

OD = (Amount of uptake at 40 min. ×3.4)
—(Amount of uptake at 140 min.)

If it is desired to determine the outward diffusion in percent per minute, the figure obtained in accordance with TABLE I.—$^{86}$Rb UPTAKE OF ERYTHROCYTES FROM CONTROL I, CANCER II, AND NORMAL SUBJECTS III

|  | Number | | |
|---|---|---|---|
|  | 42 | 51 | 17 |
| Packed red cell volume | 42±.6 | 34.7±1.0 | 44.1±.9 |
| Point E from ion space in percent | 17.5 | 12.6 | 20 |
| Point E in minutes (Method 1) | 34 | 24 | 35 |
| E calculated from slope change, min. (Method 2) | 32 | 26 | 38 |
| Tangent at E in minutes [1] | 108 | 87.5 | 105 |
| Active uptake, percent per minute | .46 | .57 | .48 |
| Outward diffusion, percent per minute | .16 | .34 | .13 |

| Average RBC, minutes | $^{86}$Rb uptake in— | | | | | | |
|---|---|---|---|---|---|---|---|
|  | 20 | 40 | 60 | 80 | 100 | 120 | 140 |
| Control | 10.7±.5 | 20.7±.7 | 28±.8 | 33.5±.9 | 38±1 | 42±1 | 46.5±1 |
| Cancer | 10±.6 | 17.8±.8 | 25.1±1.4 | 29±1 | 33±1 | 35.8±1 | 38.7±.7 |
| Normal | 10.8±1 | 22.1±1 | 31.9±1 | 39.9±1 | 45±2 | 50±2 | 55±2 |

[1] Corrected to packed cell volume of 42.

Table I and FIGS. 5–7 demonstrate the significantly different results obtained in the cancer group compared with the other two groups. These differences are sufficient to indicate the presence of cancer. In subsequent clinical investigations in which the cancer patients received suitable therapy, including X-ray and chemotherapy, the red blood cell kinetics gave varying results when compared to untreated cancer patients of the same type or as compared with controls. Most patients receiving chemotherapy showed a reduction in the normally high $^{86}$Rb red cell uptake observed in untreated cancer patients. Following chemotherapy, only outward diffusion was observed to be significantly different than normal. The method can thus be used to detect an early cancer, measure the activity of a known cancer, or reflect the suppressive effect of various therapies on this activity.

The above describes an accurate method for determining the desired information. In extensive studies it has been discovered that the location of point E is not essential where approximations of the active uptake and outward diffusion rates can be used. It appears that when the uptake of radioactive cations is determined at approximately 40 minutes and thereafter at approximately 140 minutes, the data collected at these two points are sufficient to construct a curve which will give sufficiently accurate information on the utpake rates and diffusion rates to detect variations from the norm of cell kinetics and otherwise make use of this information as discussed above.

In general, the approximations are used for determining the active uptake and outward diffusion as before. The amount present in the cells at 40 minutes represents the amount of uptake at the approximated equilibrium point. The second reading is taken at an arbitrary time sufficiently long to provide significant data so that an average rate can be computed between the two points. The arbitrary time selected should be short of that time where an overall plasma cell equilibrium is reached. As noted, somewhere in the time range of 130–150 minutes from the commencement of incubation is a most suitable time the formula for outward diffusion (which represents net loss by outward diffusion) is simply divided by the number of minutes between point E and the final time such as 140 minutes or other selected time when the net uptake is determined. Since point E is not determined in this approximate approach, it must be estimated. It has been found that point E will generally fall at about 40 minutes so that the estimated time period during which the outward diffusion is occurring will be about 100 minutes (140–40). Whereas a figure of 100 minutes is a good average, a variation from 80–120 minutes will provide usable information depending on other conditions involved.

With respect to FIGS. 1–4, suitable apparatus for making the measurements required to practice the invention is illustrated. The devices offer the advantages of simplicity and ready adaptation to clinical testing in a "kit" form. In FIG. 1 a device comprising a pair of parallel chambers 10 and 11 are joined at one end with a transverse conduit 12. Chamber 11 includes an inlet 13 with a mating stopper 14 that is operable for introducing a blood sample into chamber 11. Chamber 11 further includes a radioactive cation source 15. In addition to a blood sample, suitable additives such as glucose may be included to support cell respiration.

A suitable combination for introduction into chamber 11 would be 10 ml. of whole blood, together with .5 ml. of glucose. Radioactive source 15 is preferably an $^{86}$Rb source of about 5 microcuries, for example. Incubation is suitably conducted at about 37° C. for selected intervals.

Following incubation, chamber 11 is rotated about rotatable joint 27 so that instead of the U configuration of FIG. 1, the configuration illustrated in FIG. 2 is obtained. Pursuant to the rotation, the incubated blood sample in chamber 11 is discharged into chamber 10 through conduit 12.

Chamber 10 includes a cation exchange resin 16 retained at the bottom by porous plate 16a. Any strong cation exchange resin with an affinity for the selected radioactive cation such as $^{86}$Rb is suitably used. A typical material is Ag-50, a cation exchange resin made by Dow Chemical Company. With respect to the quantities of fluid discussed above, it is suitable to use about 125 mg. of 50-100 mesh resin in chamber 10.

When the incubated blood is contacted with the cation exchange resin, the resin takes up only rubidium present in the plasma, but not from the red cells. Because of this there is no need to first separate the cells and plasma. In use, if the total amount of $^{86}$Rb dissolved in the blood during incubation in chamber 11 is known, and the amount in the plasma only is all exchanged into the resin and measured, the amount of radioactive cation taken up by the cells can be established from the difference between the two values. In measuring the amount of $^{86}$Rb in resin 16, chamber 10 can be handled as a tube and the tracer counted, for example, in a suitable automatic scintilaltion spectrometer in the usual way. Before taking readings, excess blood solution will usually be washed from the resin with a suitable isotonic solution designed to wash the resin without removing the radioactive cation in the resin.

As an alternative to the device of FIGS. 1-2, chamber 10 and 11 and transverse conduit 12 can be made from a flexible material such as polyethylene so that it can be bent into a relatively straight line to promote drainage from chamber 11 to chamber 10. This would eliminate the need for rotatable joint 27. In either case chamber 10 can be inserted into a radioactive counter while attached to the device or if desired chamber 10 may be severed before counting.

FIGS. 3 and 4 illustrate an alternative embodiment for practicing the present method. In this embodiment a container 17 is used to hold a blood sample 17a, together with desired glucose or other additives. An elongate stick 18 includes a first end 19 that is recessed at 20. A radioactive cation source 21 is mounted within recess 20. Cover 22 is apertured or otherwise made permeable to allow contact and dissolving of the cation source 21 into the blood sample 17a when end 19 is inserted therein, as shown in FIG. 4.

The opposite end 23 of stick 18 is similar to end 19 and includes a recess 24 and fluid permeable cover 25. Instead of a radioactive source, recess 24 contains a cation exchange resin 26.

Following a predetermined period of incubation during which stick 18 is inserted in vessel 17, as shown in FIG. 4, stick 18 is inverted and end 23 is inserted in the blood sample so that the radioactive cation present in the physiological diluent used with the cells being measured can be taken up by the resin. The radioactive content in resin 26 of stick 18 can then be counted with a suitable instrument.

In using the devices of FIGS. 1-4, the amount of blood sample and the blood cell count are first determined. The measurements can then be made in one of two ways. If the initial amount of radioactive cation dissolved into the diluent or plasma is known, the cell uptake is simply calculated by measuring the amount in the resin. Uptake by the cells represents the difference between the initial amount of cation and that present in the resin.

Alternatively, the resin can be preloaded with a known amount of radioactive cation. Following a period of contact between the blood sample and the resin, the amount of radioactive cation remaining in the resin can be counted. The difference between the starting preloaded concentration in the resin and that remaining following incubation represents the amount taken up by the blood cells.

In using the devices such as those of FIGS. 1-4, it will be appreciated that only two determinations on a patient's blood will have to be made in order to obtain the desired information. For example, a first reading can be made at 40 minutes of incubation and a second reading at 140 minutes of incubation.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for measuring cell membrane kinetics comprising: providing cells to be measured in a physiological diluent; adding radioactive cations to said solution for uptake by said cells; determining the equilibrium point where passive diffusive movement of ions into and out of said cells is substantially equal; and measuring the rate of uptake of said radioactive cations by said cells at said equilibrium point, the rate of said equilibrium point being the pumping or active transport rate for the cells, said rate of uptake being measured indidirectly by determining the rate of radioactive cation disappearance from the physiological diluent by measuring the amount of radioactive cations in the physiological diluent in the presence of said cells by contacting the diluent and cells with a cation exchange resin and measuring the amount of radioactive cation in said resin following said contact.

2. The method in accordance with claim 1 wherein said cells are red blood cells, said physiological diluent is blood plasma, and wherein the said equilibrium point is determined from the formula $$E = \frac{S}{P+S} - e$$

wherein E is the equilibrium point in percent of radioactive cation concentration between the cells and the surrounding diluent S=relative radioactive cation space in the cells, P=relative radioactive cation space in the surrounding diluent, and e=radioactive cation uptake in the first four minutes after the cation is introduced into the plasma.

3. The method in accordance with claim 1 wherein said equilibrium point is determined by measuring the radioactive cation uptake rate by the cells over a preselected time and establishing the point where said uptake rate changes from a relatively fast rate to a relatively slower rate.

4. The method in accordance with claim 1 wherein said cells are red blood cells and said radioactive cation is $^{86}$Rb.

5. The method in accordance with claim 1 wherein said cation exchange resin is free of radioactive cations before said contact, said physiological diluent contains a predetermined amount of radioactive cations preparatory to uptake by said cells, and said cation exchange resin removes substantially all radioactive cation in the diluent following uptake by said cells.

6. The method in accordance with claim 1 wherein said resin contains a predetermined amount of radioactive cations, a portion of the radioactive cations in the resin being exchanged through said diluent to the cells upon contact of the diluent by the cation exchange resin, and the amount of uptake by said cells is determined by measuring the amount of radioactive cation remaining in the resin following said contact with the diluent.

7. In the process for detecting the presence of cancer by detecting variations from the norm in the permeability to radioactive cations of red blood cell membranes of a cancerous patient, the improvement comprising determining the equilibrium point where passive diffusive movement of the ions into and out of said cells is substantially equal; measuring the active rate of the uptake of cations by the cells at said equilibrium point; and then determining the passive rate of cation transport of said cells based upon the previously determined active uptake rate, said rate of uptake being determined by contacting the cells with a cation exchange resin and measuring the amount of radioactive cation in said resin following said contact.

8. The improved process in accordance with claim 7 wherein the measurement of said passive ion transport rate is determined in terms of outward diffusion of cations from said cells in accordance with the following formula:

$$OD = \frac{AU \times (T-X) - OBS}{T-E}$$

wherein OD=outward diffusion rate, AU=active uptake rate at said equilibrium point, T=preselected time following said equilibrium point, X=preselected time between said equilibrium point and time T, E=time to reach said equilibrium and OBS=observed transported cation content in the cells at time T.

References Cited

Scott et al.: Federation Proceedings, March-April 1967, vol. 26, No. 2; Abstracts, 51st Annual Meeting, Chicago, Ill., April 16–21, 1967; published by Federation of American Societies for Exp. Biology; Psychoparmacology, II, 1380.

Kahn, J. B.: "The Entry of Rubidium into Human Brythrocyties," J. Pharmacol. Exp. Therap., 136, 197–204, 1962.

Review Gastroentenology, M. M. Black, 1950, pp. 481–487.

R. Henry et al., J.A.M.A., vol. 147, No. 1, September 1951, pp. 37–39.

MORRIS O. WOLK, Primary Examiner

B. S. RICHMAN, Assistant Examiner

U.S. Cl. X.R.

23—253; 424—1